United States Patent [19]

Busby

[11] Patent Number: 5,004,267
[45] Date of Patent: Apr. 2, 1991

[54] POWER OPERATED SUPPORT OR LANDING LEGS

[76] Inventor: Philip V. Busby, 2 Sunderland Avenue, Pembroke Dock, Dyfed, Wales

[21] Appl. No.: 366,193

[22] Filed: Jun. 8, 1989

Related U.S. Application Data

[63] Continuation of Ser. No. 203,541, May 27, 1988, abandoned, which is a continuation of Ser. No. 790,076, Oct. 22, 1985, abandoned.

[30] Foreign Application Priority Data

Oct. 23, 1984 [GB] United Kingdom ............... 8426750

[51] Int. Cl.⁵ ............................................... B60S 9/02
[52] U.S. Cl. ..................................... 280/766.1; 303/7
[58] Field of Search ............................. 303/7, 28, 2; 280/763.1, 764.1, 765.1, 766.1

[56] References Cited

U.S. PATENT DOCUMENTS

| 3,010,768 | 11/1961 | Obrin | 303/7 |
| 3,497,268 | 2/1970 | Dobrikin | 303/7 |
| 3,780,819 | 12/1973 | Coordes | 303/7 X |
| 3,912,293 | 10/1975 | Harbers | 280/764.1 X |
| 4,007,847 | 2/1977 | Marco | 280/766.1 X |
| 4,466,637 | 8/1984 | Nelson | 280/766.1 |

FOREIGN PATENT DOCUMENTS

| 1355194 | 6/1974 | United Kingdom . |
| 2077205 | 12/1981 | United Kingdom . |
| 2091657 | 8/1982 | United Kingdom . |

Primary Examiner—David M. Mitchell
Assistant Examiner—Michael Mar
Attorney, Agent, or Firm—Blakely, Sokoloff, Taylor & Zafman

[57] ABSTRACT

The invention provides a system for selective extension and retraction of a support leg of equipment such as a trailer or dock leveller, comprising a fluid motor which is adapted to be mechanically connected with an actuating member of the leg whereby on operation of the motor the leg can be extended or retracted, and apparatus for mounting the system onthe equipment so that a drive line from the motor to the acutating member is non-linear.

15 Claims, 4 Drawing Sheets

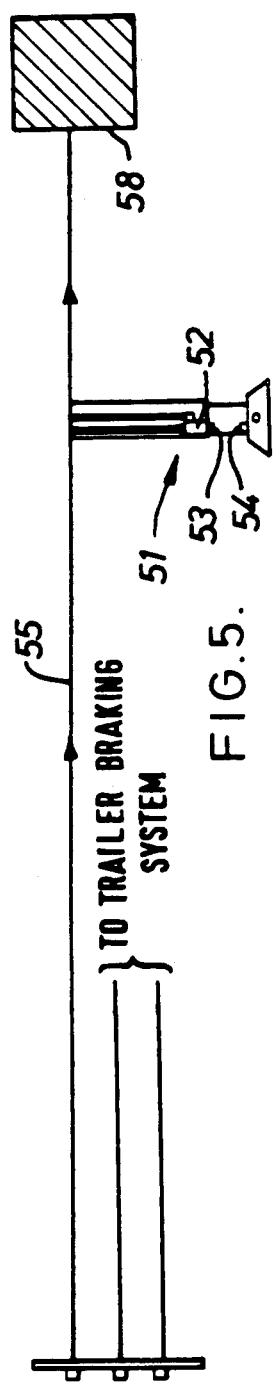
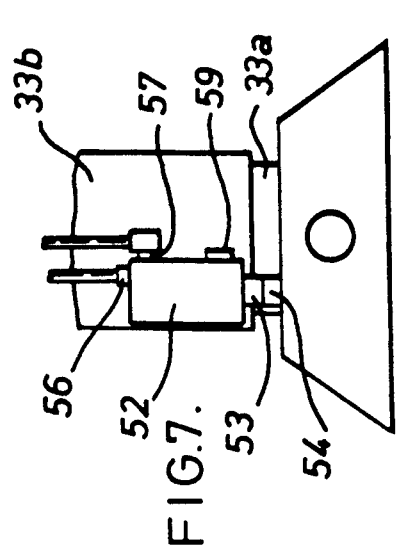
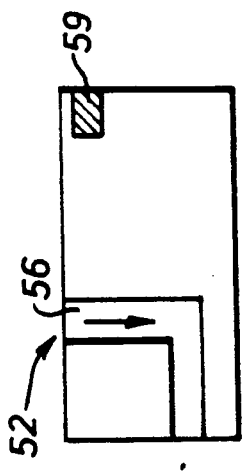
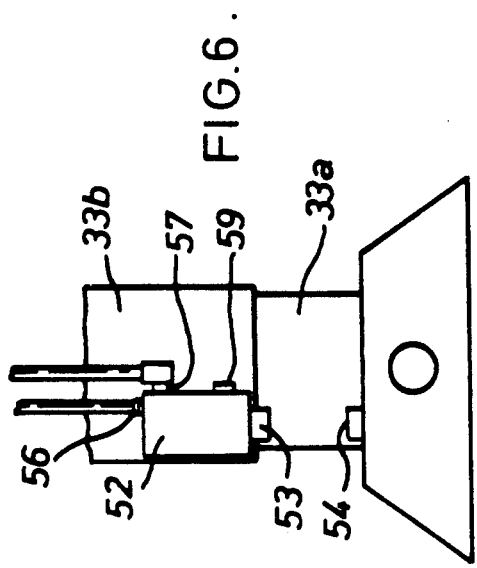
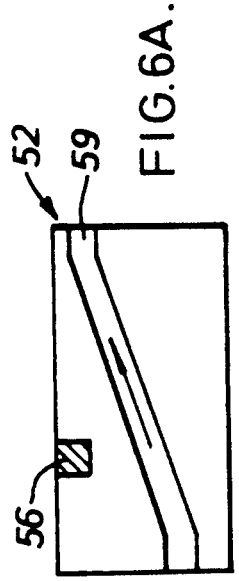

POWER OPERATED SUPPORT OR LANDING LEGS

This is a continuation of application Ser. No. 203,541 filed 5/27/88 abandoned, a continuation of application Ser. No. 790,076 filed 10/22/85, abandoned.

Various proposals have been made over a number of years for the power operation of support or landing legs for trailer vehicles so as to eliminate the arduous and time consuming manual operation which still predominates. One solution which has been in limited use for many years uses hydraulically operated legs. These are expensive and are vulnerable to accidental damage which is frequently costly and time consuming to repair. A number of proposals for air pressure operation of landing legs have been made but these have had disadvantages which have rendered them unacceptable and not commercially viable.

It sometimes happens that support or landing legs are not fully extended before a semi-trailer is put down by a tractor. In consequence it is necessary that power operated landing legs should have the capacity to be able to lift a fully laden trailer to a sufficient height to enable it to be picked up by a tractor with its fifth wheel coupling and in an acceptable time. Some tractors have a different fifth wheel coupling height than other tractors. The problem is further complicated by the fact that different tractors have air compressors of different capacities and in some cases the amount of air available for operation of landing legs may be inadequate. There are also safety considerations to be taken into account to ensure that the legs cannot be retracted by power operation, whether by accident or act of vandalism, without the front end of the semi trailer being supported by a tractor.

According to the invention there is provided a system for selective extension and retraction of a support leg of equipment such as a trailer or dock leveller, comprising a fluid motor which is adapted to be mechanically connected with an actuating member of the leg whereby on operation of the motor the leg can be extended or retracted, and means for mounting the system on the equipment so that a drive line from the motor to the actuating member is non-linear.

The drive line may be angular.

The angle may be substantially 90°.

The motor may be an air motor.

The system may include an air reservoir, a valve for protecting brakes of the trailer, and directional control valve means pneumatically connected together with the air motor.

The means for mounting the system on the equipment may comprise an elongate rigid support member adapted to be secured at one end to the equipment and at the other end at or adjacent the motor.

The elongate rigid support member may be adjustable in length whereby to provide an adjustable gear ratio for gearing for extending and retracting the leg.

The elongate rigid support member may comprise an elongate part telescopically mounted in an elongate tubular part, and the two parts may be releasably secured together by releasable securing means at different telescopic engagements, whereby the support member is adjustable in length.

The mechanical connection of the motor with the actuating member may be adjustable, whereby to provide an adjustable gear ratio for gearing for extending and retracting the leg.

The air reservoir may comprise a reservoir for the braking system of the equipment.

The system may include means to control movement of the leg in one direction only.

The means may comprise a limit switch on the leg and a 3-way valve.

According to another aspect, the invention provides equipment such as a trailer or dock leveller having a support leg which is adapted for selective extension and retraction by a system as hereinbefore defined.

The equipment may include two support legs which may be mechanically interconnected and adapted for selective extension and retraction in unison by the system, which is mechanically connected with the actuating member of one leg.

The system which is a pressure air system, may include other components which are conventionally fitted in a pressure air system, for example filters, lubricators and driers upstream of the air motor.

There may be a brake protection valve provided to protect the vehicle trailer air braking system by ensuring that a minimum pressure of air is available for operation of the brakes before air can be supplied to the air motor.

Valve means may be provided at the inlet to the reservoir to retain the charge of air when the tractor air supply is disconnected.

According to a further aspect of the invention there is provided a power drive system for a set of landing legs for equipment such as a vehicle trailer or dock leveller, which legs are extendable and retractable by mechanical actuating means including a rotatable shaft, comprising, in combination, an air driven rotary motor adapted to be mounted so that its driven shaft extends generally longitudinally of the vehicle, a speed reduction gear drivingly connected to said driven shaft, means to turn the drive line of said driven shaft through substantially ninety degrees so that it is directed transversely of the vehicle, means to connect said speed reduction gear drivingly to an end of the rotatable shaft and directional control valve means for the motor whereby a supply of pressurised air may be selectively applied to the motor to drive it in either direction to cause extension and retraction of the landing legs.

The invention also comprises a vehicle trailer fitted with landing legs and a power drive system as set out above.

The air driven rotary motor, speed reduction gear and means to turn the drive line may be mounted as a unit to be carried by the vehicle trailer and slidably moved between first and second positions relative thereto which positions correspond with the engagement respectively of high and low gear of a set of two speed landings legs, the gear change being effected by longitudinal movement of the rotatable shaft. Alternatively, a slidable connection may be provided between the speed reduction gear and the rotatable shaft whereby the unit may be fixed to the vehicle trailer and use made of the slidable connection to effect the gear change.

The invention will now be described by way of example with reference to the accompanying drawings in which:

FIG. 5 is a schematic view of a trailer and support leg therefor which has means to control movement of the leg in one direction only;

FIGS. 6 and 6A show respectively a leg of the semi trailer in the extended or down position, and a 3-way valve comprising part of the means; and FIGS. 7 and 7A show respectively the leg in the retracted or raised positon and an alternate position of this 3-way valve.

Figure 1:
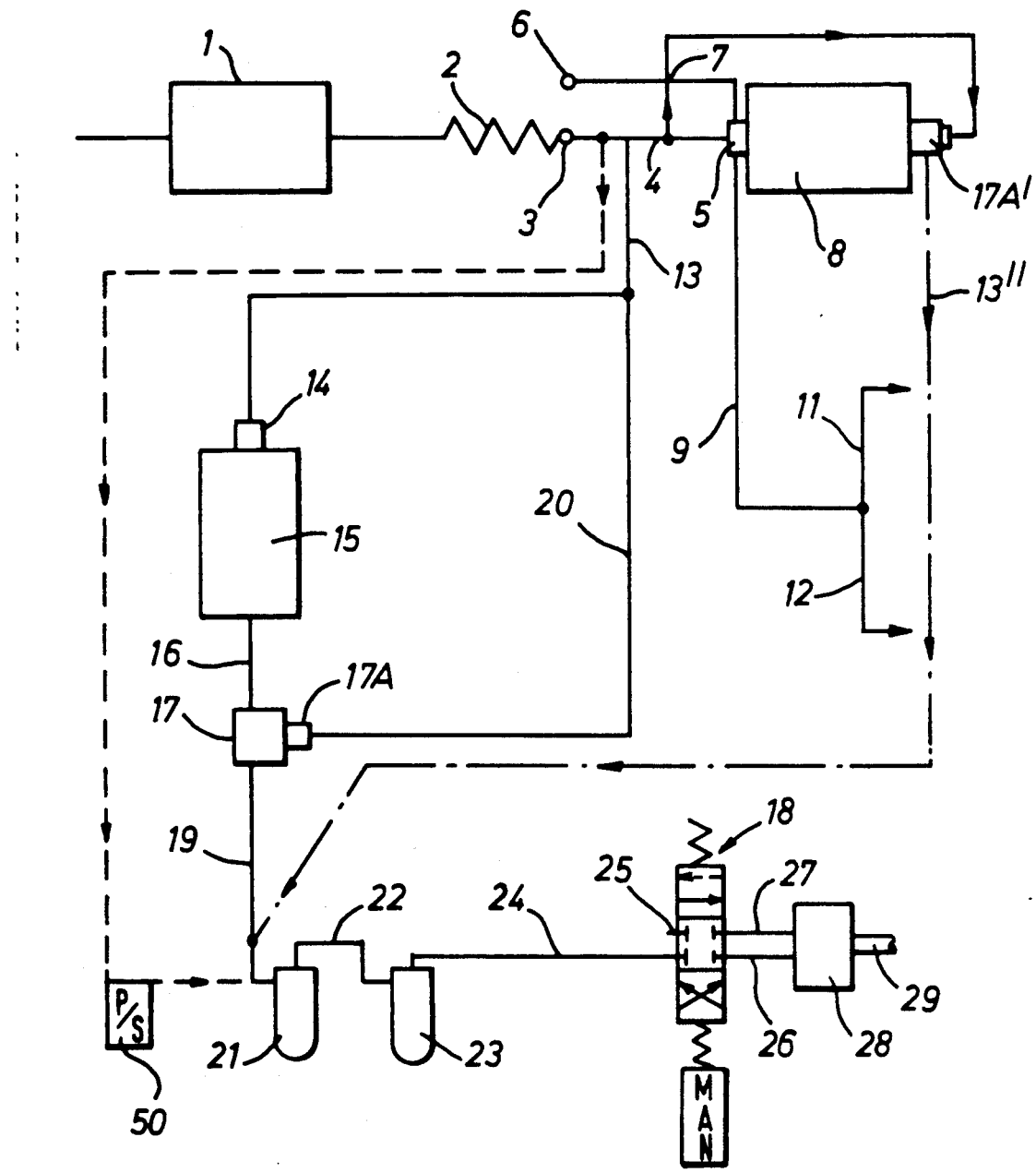
FIG. 1 is a circuit diagram of an air system and part of the air supply system for operating the brakes of a semi trailer.

Referring to the drawing FIG. 1, a tractor has a service air reservoir 1 supplied by an engine driven compressor on the tractor. Reservoir 1 supplies air under pressure to the brake emergency line on a trailer to which the tractor is connected via a flexible connecting pipe 2 and a trailer connection 3 of the quick fit and release type. Connection 3 is connected by a pipe 4 to one port of the relay emergency valve 5. A trailer connection 6, of the quick fit and release type, also receives air under pressure from reservoir 1 via a dual foot valve and flexible connecting pipe (not shown) for normal operation of the trailer brakes via pipe 7 and relay emergency valve 5. Valve 5 is connected to the trailer air reservoir 8 and air is supplied to the trailer brakes via pipes 9, 11 and 12. This is all in accordance with conventional practice for braking of trailers.

In an embodiment of this invention one end of a pipe 13 is connected via a "T" piece into the pipe 4 and the other end of pipe 13 is connected to a check valve 14 at the inlet to an air reservoir 15. An outlet of the reservoir 15 is connected by a pipe 16 to the inlet of a normally closed pilot operated valve 17 (the brake protection valve). The outlet from valve 17 is connected to a manually operated 3 position spring centred blind neutral four way valve 18 (the directional control valve) via pipe 19, filter 21, pipe 22, lubricator 23 and pipe 24. The valve 18 has a connection 25 to atmosphere and connections 26, 27 to the ports of a reversible rotary air motor 28 whose driven shaft is indicated at 29. The pilot 17A of valve 17 is connected by a pipe 20 to the pipe 13.

When the tractor connection 2 is made to the trailer at 3 air under pressure from the tractor is made available to reservoirs 8 and 15. The pilot 17A is arranged so that it will not operate unless an adequate reserve of pressure, for example 40 lbs per square inch (2.7 Bar), is available for operation of the trailer brakes. When this pressure is exceeded the pilot 17A opens causing valve 17 to open and admit air under pressure to valve 18. Valve 18 may be operated by a conventional lever (18A, FIG. 4) to move it to either extreme position and cause the air motor to be driven in the corresponding direction. The charge of air in reservoirs 1, 15 together with the discharge from the compressor on the tractor, facilitates a satisfactorily speedy extension and retraction of the support or landing legs together with the necessary reserve to enable a fully laden trailer to be lifted.

When the trailer support legs have been extended and the connection lines 2 et al (and other connections such as electrical) have been disconnected the tractor can then be withdrawn leaving the trailer in a parked condition. The pressure in pipe 13 falls to atmospheric and consequently the pilot 17A closes, as does valve 17, so that the air motor 28 cannot now be operated and the support legs remain in their extended condition until the minimum air pressure is again available to open pilot 17A, i.e. when another tractor is coupled up pneumatically to the trailer. The check valve 14 ensures that the reservoir 15 remains charged (as does the reservoir 8) in readiness for the next operation of the support legs.

The valve 17 thus acts to ensure that adequate brake pressure is available before the support legs can be extended or retracted. The reservoir 15 facilitates an adequate supply of air under pressure to ensure speedy extension and retraction of the legs and a reserve to ensure that a fully laden trailer can be lifted.

It will be appreciated that the check valve 14 could be omitted allowing discharge of reservoir 15 when the connection 3 is broken. If this is done the cycle time for extension and retraction of the landing legs is necessarily extended whilst the reservoir 15 is recharged. The brake protection valve could take a number of alternative forms. For example, it could be a pressure regulating valve in the same position as valve 17 and which opens automatically at the selected minimum pressure. In this case it would be desirable to allow release of at least some of the charge from reservoir 15 when connection 3 is broken so as to ensure the air motor cannot be operated. Alternatively, the brake protection valve might be a pilot operated shuttle valve at the inlet to reservoir 15, that is, in lieu of check valve 14. This would exhaust the reservoir 15 when no pilot pressure is available. When pilot pressure is available it would close the exhaust and allow chargin of the reservoir 15, and actuation of the landing legs.

Figure 2:
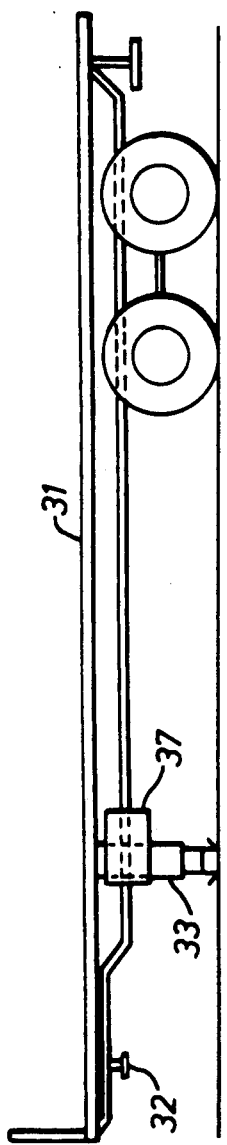
FIG. 2 is a side elevation of a semi trailer.
Figure 3:
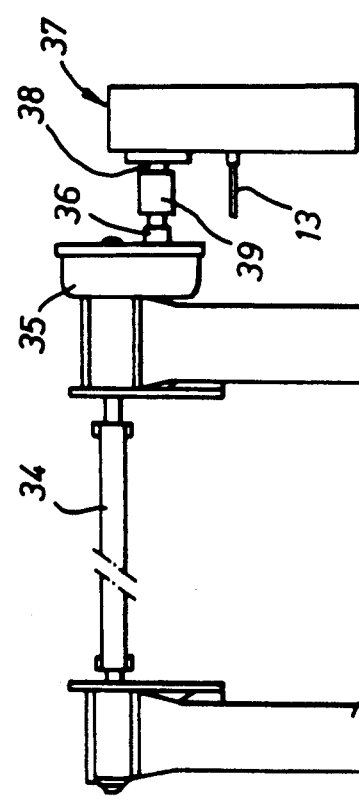
FIG. 3 is a front elevation of a set of landing legs with an air operated power unit for their actuation.

Referring now to FIGS. 2 and 3, a semi trailer 31, having a kingpin 32 for co-operation with a fifth wheel coupling of a tractor, is supported towards its front end by a pair of conventional proprietory support legs 33. These support or landing legs are telescopically extended and retracted in unison by a screw mechanism operated by a rotary shaft (as 34, FIG. 3) and bevel gears (not shown) in the top of each leg. Frequently the rotary shaft is connected to the output of a two speed gearbox as 35. The input shaft 36 for the gearbox is arranged to receive a crank handle which is rotated manually to raise and lower the legs. The change between high and low gears is effected by a longitudinal movement of the input shaft 36.

A power system or unit 37 emboyding the invention has a driven shaft 38 which is mechanically connected at 39 to the input shaft 36 of gearbox 35. An air supply pipe 13 (see also FIG. 1) for the unit is shown. (Shaft 38 and connector 39 are equivalent to shaft 29 in FIG. 1).

Figure 4:
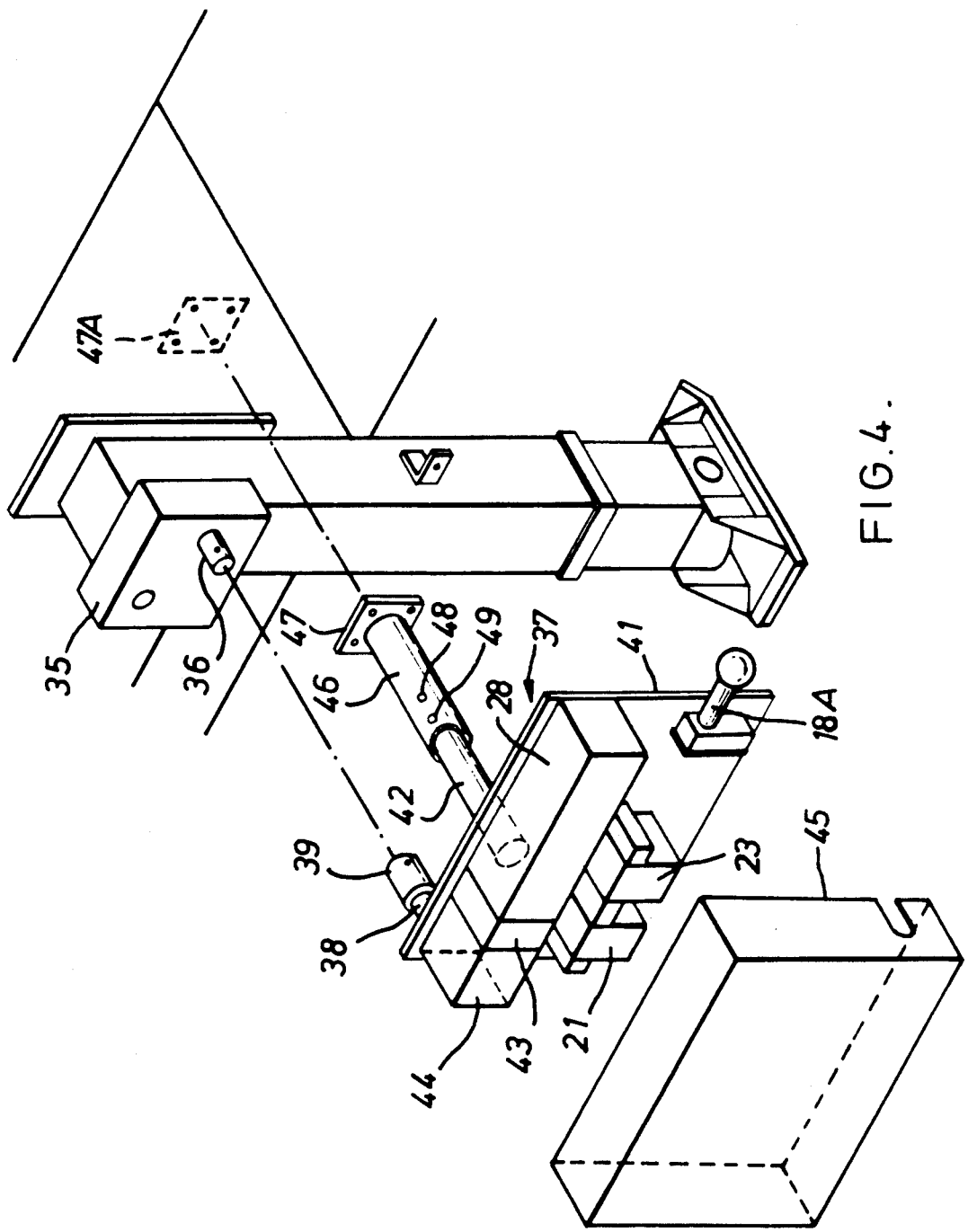
FIG. 4 is a schematic perspective view showing one of a set of landing legs and an air operated power unit.

Referring now to FIG. 4, in conjunction with FIG. 1, the unit 37 comprises a mounting plate 41 to which a mountig tube 42 is secured as by welding. The air motor 28, for example of the vane type, reduction gear 43, bevel gear 44 (to turn the drive line through 90 degrees), filter 21, lubricator 23 and directional control valve 18 (with operating lever 18A) are all mounted on plate 41 and a cover 45 fits over the mounted components and is secured to plate 41.

An elongate support member in the form of a support tube 46 has a flange 47 which is bolted to a mounting, for example a side member of the trailer chassis, as at 47A. The tube 42 is slidably received within support tube 46 which thus carries the unit 37. As has already been mentioned the input shaft 36 of gearbox 35 is moved longitudinally to effect a change between high and low gear. Support tube 46 has two spaced through holes 48, 49.

The positioning of these holes 48, 49 and a through hole (not shown) in mounting tube 42 is such that the hole in tube 42 is in register with hole 48 when one gear is engaged and in register with hole 49 when the other gear is engaged. A removable pin (not shown) passes through the registering holes to locate the unit securely on the trailer. The pin is removed and the unit is moved in or out as the case may be to change gear and the pin is then replaced to secure the unit 37. Low gear is required for lifting a laden trailer whereas high gear is used for rapid raising and lowering of the legs under no load.

The mounted components of the unit and in particular the air motor, are mounted so as to provide a unit of minimum width so as to keep within the overall legal permitted width of the trailer and also so as to minimise the vulnerability of the unit to accidental damage. To this end the pipe connection (24, FIG. 1) between the lubricator 23 and valve 18 may be made on the trailer side of plate 41, thus leaving more space for the pipes 26, 27 (FIG. 1) within the unit 37.

It will be appreciated that the power unit which has been described can readily be fitted to the existing robust standard support or landing legs for trailers and thus avoids the disadvantages of the hydraulically operated legs and at considerably less cost. In the event of a malfunction the possibility of manual operation of the legs is retained. The coupling 39, preferably secured with a releasable pin, is released and the pin in mounting tube 48 is removed allowing the unit to be withdrawn. The normal cranking handle can then be fitted to input shaft 36 and the legs actuated manually. If the malfunction is in the unit 37 it will be seen that this can be replaced simply and quickly if a replacement unit is available. The possibility exists of incorporating a power unit such as has been described in the design of the landing legs. The relative positions of the reduction gear 43 and bevel gear 44 in the drive line may be varied if desired. The bevel gear may incorporate a gear reduction. As an alternative to movement of the power unit to effect a gear change the coupling 39 may be made slidable on shaft 38 whereby the gearchange is effected by movement of coupling 39.

FIG. 1 shows variations in air supply lines to the air motor 28. That variation shown in dashed lines comprises an air pipe or line 13' connected downstream of a trailer connection 3 via a selector valve 50 to the motor 28 through the filter 21, pipe 22, lubricator 23, pipe 24 and the valve 18. This system thus essentially obviates the need for the separate air reservoir 15 and operates from the tractor air reservoir 1 to actuate the support legs 33 (FIG. 3) as before.

Another variation shown in FIG. 1, in chain-dotted lines, avoids the necessity of providing air reservoir 15 by utilising an air pipe or line 13" which is connected between the trailer air reservoir 8, via a pilot 17A', which protects the braking system 6,7,9,11, and 12, and the air motor 28, to operate support legs 33 as before. This alternative system includes item 21,22,23,24, 18 as before too. This alternative system using air pipe 13" can be self-contained on a trailer and avoids the necessity to provide an expensive additional air reservoir 15.

In all the embodiments, there may be means 51 operative to ensure that the legs 33 only operate in a desired direction starting from a given state thereof. The means 33 comprises a three way valve 52 and a switch comprising a stud button 53 carried by the valve 52 and a stud 54 on the part 33a of the leg 33 which reciprocates into and out of part 33b which is secured to the trailer 31. The valve 52 is connected into the auxiliary vehicle braking line 55 so that the inlet port 56 (air "in") is connected to the line 55 and the port 57 is connected to a trailer brake lock 58 which locks the trailer brakes on if the air pressure drops below 45 p.s.i., or on uncoupling of the tractor unit. In this latter case the valve 52 is in the FIG. 6A position and the air passes from the cylinder 1, 8 or 15 to exhaust port 59, so locking the leg 33 down. When the lines are re-connected, the only way the system can operate is to raise the leg 33 when the cylinder 1,8 or 15 is connected with the motor 28 until the stud 54 engages the stud button 53 to move the valve 52 to the position shown in FIG. 7A, and maintain the leg 33 in the raised position. The valve 52 and stud/stud button 54/53 thus act as a limit switch or limit control means. The converse is true in that when the leg 33 is up (FIGS. 7, 7A) it can only be moved down on positive operation of the system. This thus provides a fail safe system for the selective extension and retraction of the legs 33.

Alternatively, the ports 56 and 57 are connected with lines 26 and 27 so that the cylinder 1, 8 or 15 is directly operable by the stud/stud button 54/53 to maintain the legs 33 in the desired raised or lowered position. This alternative arrangement therefore works in a similar fashion to that discussed with respect to the brake system.

Whilst this invention has been described with reference to the landing legs of a semi-trailer it will be appreciated that it may be applied to other support legs, for example a dock leveller for dock levelling. Again, individual power units may be fitted to support legs which are not mechanically interconnected, so as to provide a platform levelling capability.

I claim:

1. A system for selective extension and retraction of a support leg of equipment adapted to be coupled to an apparatus for moving said equipment when said support leg is retracted, said system comprising:
   (i) an air motor;
   (ii) an actuating member of the support leg, said motor and actuating member being adapted to be mechanically coupled to one another such that selective operation of said air motor extends and retracts said leg;
   (iii) means for mounting the system on the equipment so that a drive line from the motor to the actuating member is non-linear;
   (iv) first and second air reservoirs operatively connected by an air line to said apparatus for receiving air therefrom, an output of said first reservoir being operatively connected to brakes of said equipment and, said second reservoir being operatively connected with said air motor;
   (v) a check valve located at an inlet of said second air reservoir;
   (vi) an automatic brake protection valve connected between the output of said second air reservoir and said air motor, said automatic brake protection valve being controlled by a pilot connected to said air line at a location upstream of said check valve for automatically closing the flow of air between said second reservoir and said air motor if the air pressure in said air line should drop below a predetermined pressure level; and
   (vii) directional control valve means pneumatically connected between said automatic brake protection valve and said air motor, wherein air is retained in said second air reservoir, according to said predetermined pressure level, when the equipment is disconnected from said apparatus.

2. A system according to claim 1, wherein the drive line is angular.

3. A system according to claim 1, wherein the angle of the drive line is substantially 90°.

4. A system according to claim 1, wherein the means for mounting the system on the equipment comprises an elongate rigid support member adapted to be secured at one end to the equipment and at the other end at or adjacent the motor.

5. A system according to claim 4, wherein the motor is an air motor and wherein the elongate rigid support member is adjustable in length so as to provide an adjustable gear ratio for gearing for extending and retracting the leg.

6. A system according to claim 4, wherein the elongate rigid support member is adjustable in length and further comprises a first elongate portion and a second elongate portion, said second elongate portion being tubular, said first elongate portion being telescopically mounted in said second elongate portion, said first and second elongate portions being releasably secured together at different telescopic engagements by releasable securing means.

7. A system according to claim 1, wherein the mechanical connection of the motor with the actuating member is adjustable, to provide an adjustable gear ratio for gearing for extending and retracting the leg.

8. A system according to claim 1, wherein the air reservoir comprises a reservoir for the braking system of the equipment.

9. A system according to claim 1, wherein there is means to control movement of the leg in one direction only.

10. A system according to claim 9, wherein the means comprises a limit switch on the leg and a 3-way valve.

11. The system according to claim 1 further comprising a support leg adapted for selective extension and retraction by said actuating member.

12. The system according to claim 11, further comprising two support legs which are mechanically interconnected and adapted for selective extension and retraction in unison and which are mechanically connected with the actuating member of one leg.

13. A power drive system for a set of landing legs for equipment, said legs being extendable and retractable by mechanical actuating means including a rotatable shaft, said system adapted to be coupled to an apparatus for moving said equipment when said support leg is retracted, said power drive system comprising:

(i) an air driven rotary motor having a driven shaft adapted to be mounted so that said driven shaft extends generally longitudinally of the equipment;

(ii) a speed reduction gear drivingly connected to said shaft;

(iii) means for turning the drive line of said driven shaft through substantially ninety degrees transversely to the equipment;

(iv) directional control valve means for controlling a direction of rotation of said motor;

(v) means for coupling said speed reduction gear drivingly to one end of the rotatable shaft and to said directional control valve means; wherein a supply of pressurized air is selectively applied to said motor to drive it in either direction, thereby causing an extension and retraction of the landing legs, said means for coupling further comprising:

(a) first and second air reservoirs operatively connected by an air line to said apparatus for receiving air therefrom, an output of said first reservoir being operatively connected to brakes of said equipment and, said second reservoir being operatively connected with said air motor;

(b) a check valve located at an inlet of said second air reservoir;

(c) an automatic brake protection valve connected between the output of said second air reservoir and said air motor, said automatic brake protection valve being controlled by a pilot connected to said air line at a location upstream of said check valve for automatically closing the flow of air between said second reservoir and said air motor if the air pressure in said air line should drop below a predetermined pressure level;

wherein, said directional control valve means is pneumatically connected between said automatic brake protection valve and said air driven rotary motor, and air is retained in said second air reservoir, according to said predetermined pressure level, when the equipment is disconnected from said apparatus.

14. A system according to claim 13, wherein the air driven rotary motor, speed reduction gear and means to turn the drive line are mounted as a unit to be carried by the vehicle trailer and slidably moved between first and second positions relative thereto which positions correspond with the engagement respectively of high and low gear of a set of two speed landings legs, the gear change being effected by longitudinal movement of the rotatable shaft.

15. A system according to claim 13, wherein there is a slidable connection between the speed reduction gear and the rotatable shaft whereby the unit may be fixed to the vehicle trailer and use made of the slidable connection to effect the gear change.

* * * * *